United States Patent
Kiest, Jr.

(10) Patent No.: US 8,418,728 B1
(45) Date of Patent: Apr. 16, 2013

(54) METHOD OF ADHERING STRUCTURAL ELEMENTS TO POLYETHYLENE AND LIKE MATERIALS

(75) Inventor: Larry W. Kiest, Jr., Ottawa, IL (US)

(73) Assignee: LMK Enterprises, Inc., Ottawa, IL (US)

( * ) Notice: Subject to any disclaimer, the term of this patent is extended or adjusted under 35 U.S.C. 154(b) by 879 days.

(21) Appl. No.: 12/496,308

(22) Filed: Jul. 1, 2009

Related U.S. Application Data

(60) Provisional application No. 61/077,504, filed on Jul. 2, 2008.

(51) Int. Cl.
*F16L 55/18* (2006.01)
(52) U.S. Cl.
USPC ....... 138/98; 138/97; 138/DIG. 1; 405/184.1; 405/156; 285/197
(58) Field of Classification Search ............... 138/97; 405/184.1, 156, 157, 154.1; 285/197
See application file for complete search history.

(56) References Cited

U.S. PATENT DOCUMENTS

| | | | | |
|---|---|---|---|---|
| 4,051,286 A | * | 9/1977 | Abbott | 428/77 |
| 4,093,675 A | * | 6/1978 | Schure et al. | 525/437 |
| 4,907,911 A | * | 3/1990 | Rodriguez et al. | 405/184.2 |
| 5,340,160 A | * | 8/1994 | Meijers et al. | 285/15 |
| 5,360,241 A | * | 11/1994 | Gundy | 285/197 |
| 5,967,192 A | * | 10/1999 | Lewin | 138/98 |
| 6,705,801 B1 | * | 3/2004 | Kiest, Jr. | 405/184.1 |

OTHER PUBLICATIONS ePlastics—Ridout Plastics Co., Inc, 1998-2012, retrieved from the Internet on Nov. 2, 2012: www.eplastics.com (3 pages).

* cited by examiner

*Primary Examiner* — Patrick F Brinson
(74) *Attorney, Agent, or Firm* — McKee, Voorhees & Sease, P.L.C.

(57) ABSTRACT

Methods of adhering structural elements to polyethylene and like materials are provided. A two-part modified epoxy adhesive is used in the repair of a main/lateral pipe junction, in connecting PE pipe to form a pipe line, in providing an access to the interior bore of a buried pipe, and other applications of requiring a buried structural element be adhered to a PE or like material.

14 Claims, 5 Drawing Sheets

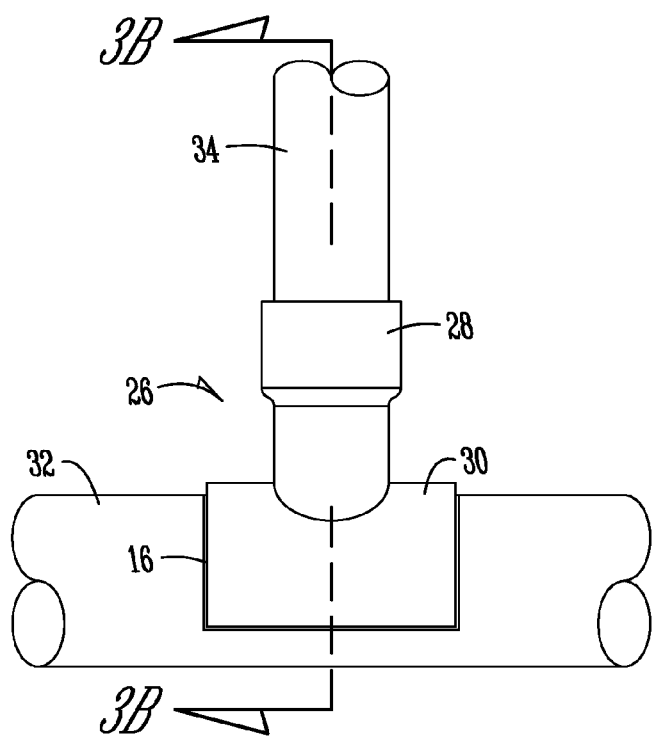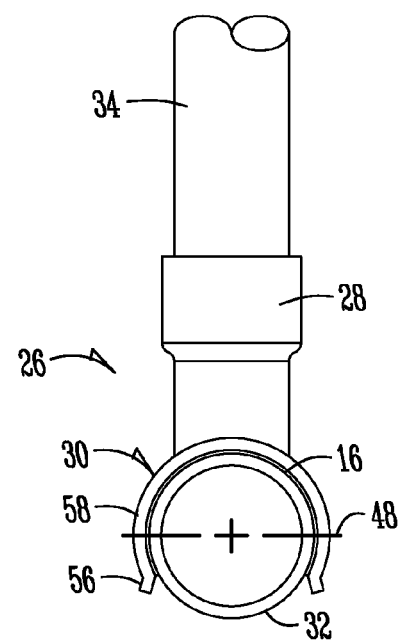
Fig.3A  Fig.3B
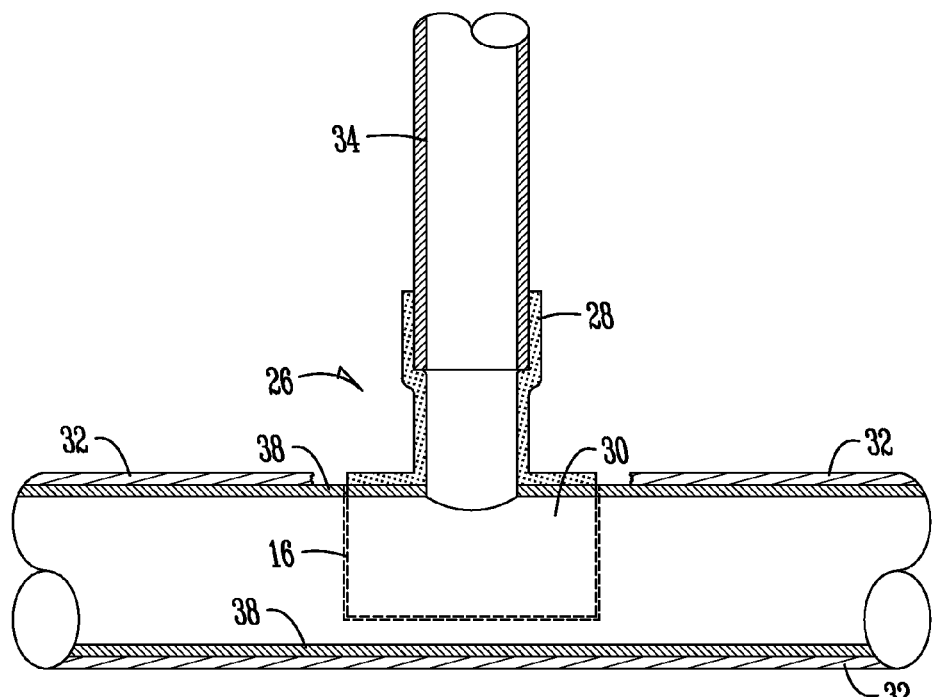
Fig.3C

METHOD OF ADHERING STRUCTURAL ELEMENTS TO POLYETHYLENE AND LIKE MATERIALS

CROSS-REFERENCE TO RELATED APPLICATIONS

This application claims priority under 35 U.S.C. §119 of a provisional application Ser. No. 61/077,504 filed Jul. 2, 2008, and which application is hereby incorporated by reference in its entirety.

BACKGROUND OF THE INVENTION

Various plastic materials have historically resisted adhesion to other materials and even to themselves. Polyethylene (PE), which is part of the olefin family of thermoplastics, is one such material. PE is a commonly used piping material with uses that range from transmission of potable water, sewage, low and high pressure natural gas, crude oil, and other chemicals and materials.

PE pipe exhibits excellent chemical resistance and physical properties; however, it also requires heat fusion or some mechanical connecting means. Heat fusion changes a material from a solid state to a liquid state while controlled pressure is applied between two fluid surfaces that are allowed to cool under pressure. Heat fusion requires a dry surface and a controlled surface preparation process which is accomplished by using expensive fusion equipment. Such equipment is electrically powered and the use of generators to power the equipment on construction sites is an added equipment cost. Accordingly, a method for connecting PE pipe to itself and other similar piping materials is needed.

PVC and other thermoplastic materials can be bonded to themselves or to other materials, but typically not to olefin-type materials or plastics that contain high levels of plasticizers. A need therefore also exists for a method of adhering materials to PVC and other thermoplastics.

It is therefore a principal object, aspect, feature or advantage of the present invention to provide a new method of adhering structural materials to thermoplastics, such as PE and like materials.

Other objects, features, aspects and/or advantages of the invention relate to a new method of connecting PE pipes together and connecting PE pipe to other pipe materials.

Further objects, features, aspects and/or advantages of the invention relate to a new method of connecting pipes using bell-and-spigot joints.

Further objects, features, aspects and/or advantages of the invention relate to a new method of repairing a junction between a main sewer pipe and a lateral sewer pipe using a connection assembly having a saddle a with connection pipe extending upwardly therefrom.

Still further objects, features, aspects and/or advantages of the invention relate to a new method of providing access to an interior bore of a buried pipe. In some instances, the buried pipe has an outer peripheral surface with an interior lining being at least partially exposed.

Further objects, features, aspects and/or advantages of the invention relate to a new method of repairing a main/lateral pipe junction wherein the main pipe has been renewed using a PE pipe or a cured-in-place pipe having an interior PE film.

Further objects, features, aspects and/or advantages of the invention relate to repairing or restraining PE pipe by injecting an epoxy adhesive through openings in pipes from within the pipe to bond the pipes together or to bond the pipe to another substrate, such as a manhole connection, thus sealing, repairing and restraining the pipe.

Further objects, features, aspects and/or advantages of the invention related to a method of forming a container from a plurality of thermoplastic panel members, such as PE panel members.

BRIEF SUMMARY OF THE INVENTION

One aspect of the invention includes a method of bonding materials to polyethylene (PE). The method generally includes providing first and second structural members of PE that both have bonding surfaces, providing a two-part epoxy adhesive, applying the epoxy adhesive to one of the bonding surfaces, joining the bonding surfaces with the epoxy adhesive disposed there between, and allowing the modified epoxy adhesive to cure and bond the structural members together. The epoxy adhesive maintains a high peel strength and flexibility when cured.

Another aspect of the invention is a method of connecting a PE pipe to form a pipe line using a pipe coupling. The epoxy adhesive is applied to the PE pipe and the pipe coupling. The PE pipe and the pipe coupling are joined with the epoxy adhesive disposed there between. The process is repeated to join the pipe coupling with a second pipe to form the pipe line. Again, the epoxy adhesive maintains a high peel strength and flexibility when cured.

Another aspect of the present invention includes a method of connecting pipes using a bell-and-spigot joint. A PE pipe having a spigot and a second pipe having an expanded bell are provided. The epoxy adhesive is applied to one of the spigot end and the expanded bell end, and the spigot end of the PE pipe is inserted into the expanded bell end of the second pipe with the epoxy adhesive disposed there between. The epoxy adhesive is allowed to cure and bond the PE pipe to the second pipe.

A further aspect of the present invention includes a method of repairing a junction between a main sewer pipe and a lateral sewer pipe wherein the main sewer pipe has an outer peripheral surface of PE or similar material. The method includes the use of a connection assembly having a saddle and a connection pipe extending upwardly there from which is adapted to receive the lateral sewer pipe. The connection assembly is attached to the main sewer pipe with the saddle surrounding a portion of the outer peripheral surface of the main sewer pipe with the epoxy adhesive disposed between the saddle and the main sewer pipe.

A still further aspect of the present invention includes a method of providing access to an interior bore of a buried lateral pipe. A connection assembly having a saddle and a connection pipe extending upwardly there from is attached to the buried lateral pipe with the saddle surrounding an outer peripheral surface of the pipe. The connection pipe is aligned with the access opening and the epoxy adhesive disposed between the saddle and the buried pipe.

A still further aspect of the present invention includes a method of providing access to an interior bore of a buried pipe having an outer peripheral surface and an interior lining with a portion of the interior lining being exposed. An access opening is formed in the exposed interior lining, and the connection assembly (as previously described) is attached to the interior lining with the connection pipe aligned with the access opening and the epoxy adhesive disposed between the connection assembly and the interior lining.

Another aspect of the present invention includes repairing the junction between a main pipe and a lateral pipe using the epoxy adhesive. The main pipe has an interior bonding surface of olefin material.

BRIEF DESCRIPTION OF THE DRAWINGS

FIG. 3A is a side view of the present invention utilized for repairing a pipeline using a saddle.

FIG. 3B is a sectional view taken along line 3B-3B of FIG. 3A.

FIG. 3C is a sectional view of the present invention utilized for providing access to an interior bore of a pipeline with an interior lining of the pipeline exposed.

DETAILED DESCRIPTION OF EXEMPLARY EMBODIMENTS

For a better understanding of the invention, several examples of forms of the invention will now be described in detail. Reference will be made to the accompanying figures. The detailed description is of exemplary embodiments only and various modifications and variations are contemplated.

The present invention makes use of a two-part modified epoxy adhesive; however, known uses of the adhesive have been limited to ceramics, concrete, wood, fiber reinforced polymers (FRP) and various metals. Although the adhesion properties of the two-part modified epoxy adhesive have been known with respect to the construction of manufactured homes, the inventor of the present application has discovered non-obvious uses for the adhesive that yield unexpected results. One example of the two-part modified epoxy adhesive suitable for use with the methods of the present invention is Flex-Weld brand modified epoxy adhesive from Manus Products, Inc. of 866 Industrial Boulevard W., Waconia, Minn. 55387.

Thermosetting plastics are polymer materials that irreversibly cure. An example of thermosetting plastics is epoxy. Epoxy is formed from the reaction of an epoxide with a polyamine. The epoxide is known as the resin, whereas the polyamine is known as the hardener or catalyst. The cure may be accomplished with heat, generally above 200° C., with a chemical reaction (two-part epoxy), or with irradiation.

The preferred two-part modified epoxy adhesive maintains a high peel strength and flexibility when cured. It is preferred that the peel strength is greater than approximately 40 pli and more preferably approximately 50 pli. As such, the preferred adhesive does not become brittle when cured and also maintains a high lap shear when cured. The lap shear is preferably greater than approximately 500 psi and more preferably approximately 750 psi.

Figure 1:
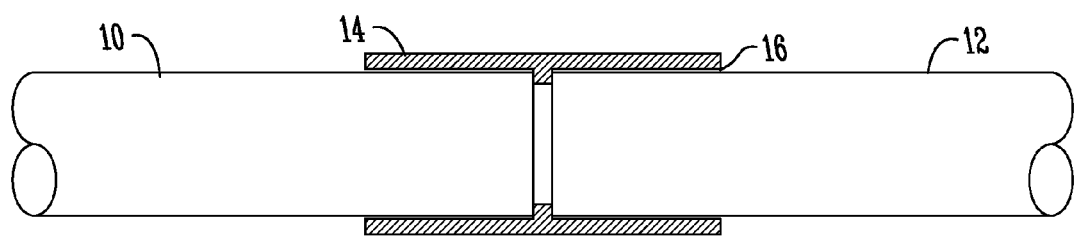
FIG. 1 is a side view of the present invention utilized for repairing a pipeline using a coupling.

One exemplary embodiment of the present invention is a new method for connecting pipes using a pipe coupling and the preferred two-part modified epoxy adhesive. As shown in FIG. 1, a first pipe 10 and second pipe 12 are fluidly connected with a pipe coupling 14. The modified epoxy adhesive 16 is applied to at least one of the first pipe 10 and the pipe coupling 14 and to at least one of the second pipe 12 and the pipe coupling 14. The first pipe 10 and the pipe coupling 14 are joined with the modified epoxy adhesive 16 disposed therebetween. The modified epoxy adhesive 16 is allowed to cure and bond the first pipe 10 to the pipe coupling 14. This process is repeated to connect the second pipe 12 with the pipe coupling 14 such that the first and second pipes 10 and 12 respectively, are fluidly connected end-to-end with the pipe coupling 14 therebetween. It should be noted that the modified epoxy adhesive 16 maintains a high peel strength and flexibility when cured. Although curing times can vary, connecting PE pipe using a standard PVC pipe coupling typically requires approximately 2-4 hours to sufficiently cure.

The method described above can be used to adhere PE pipe or PVC pipe to itself, to each other, or to vitrified clay pipe, or concrete pipe, iron pipe or cured-in-place pipe. The pipe coupling 14 can be made of various materials with PE and PVC being the preferred materials. Applicant has also found that the method described above can be used even when the pipes 10 and 12 are submerged under water and no surface preparation work is performed, such as scoring or roughening the PE surface or applying heat or a solvent to soften the PE.

Another exemplary embodiment of the present invention includes a method of connecting pipes using a traditional bell-and-spigot joint. A bell-and-spigot refers to a joint in which a pipe ending in a bell-like shape is joined to a pipe ending in a spigot-like shape. It is used to connect sections of a pipeline wherein the straight spigot end of one section is inserted into the flared-out end of the adjoining section. The joint is typically sealed by a compressible ring. However, changes in temperature and the resulting shrinkage of the pipe can cause the pipes to separate from one another.

Figure 2:
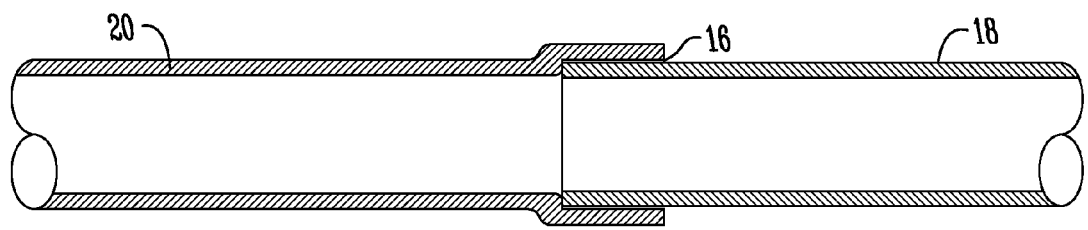
FIG. 2 is a side view of the present invention utilized for repairing a pipeline using a bell-and-spigot joint.

As shown in FIG. 2, a first pipe 18 is shown having a spigot end and a second pipe 20 is shown having an expanded bell end. The preferred two-part modified epoxy adhesive 16 is applied to at least one of the spigot end 18 and the expanded bell end 20 of the adjacent pipes. The spigot end of the first pipe 18 is then inserted into the expanded bell end of the second pipe 20 with the modified epoxy adhesive 16 disposed between the pipes. The modified epoxy adhesive 16 is allowed to cure and bond the first pipe 18 to the second pipe 20 where the modified epoxy adhesive 16 maintains a high peel strength and flexibility when cured. Such a method is preferably for use in connecting PE or PVC pipe.

Figure 4:
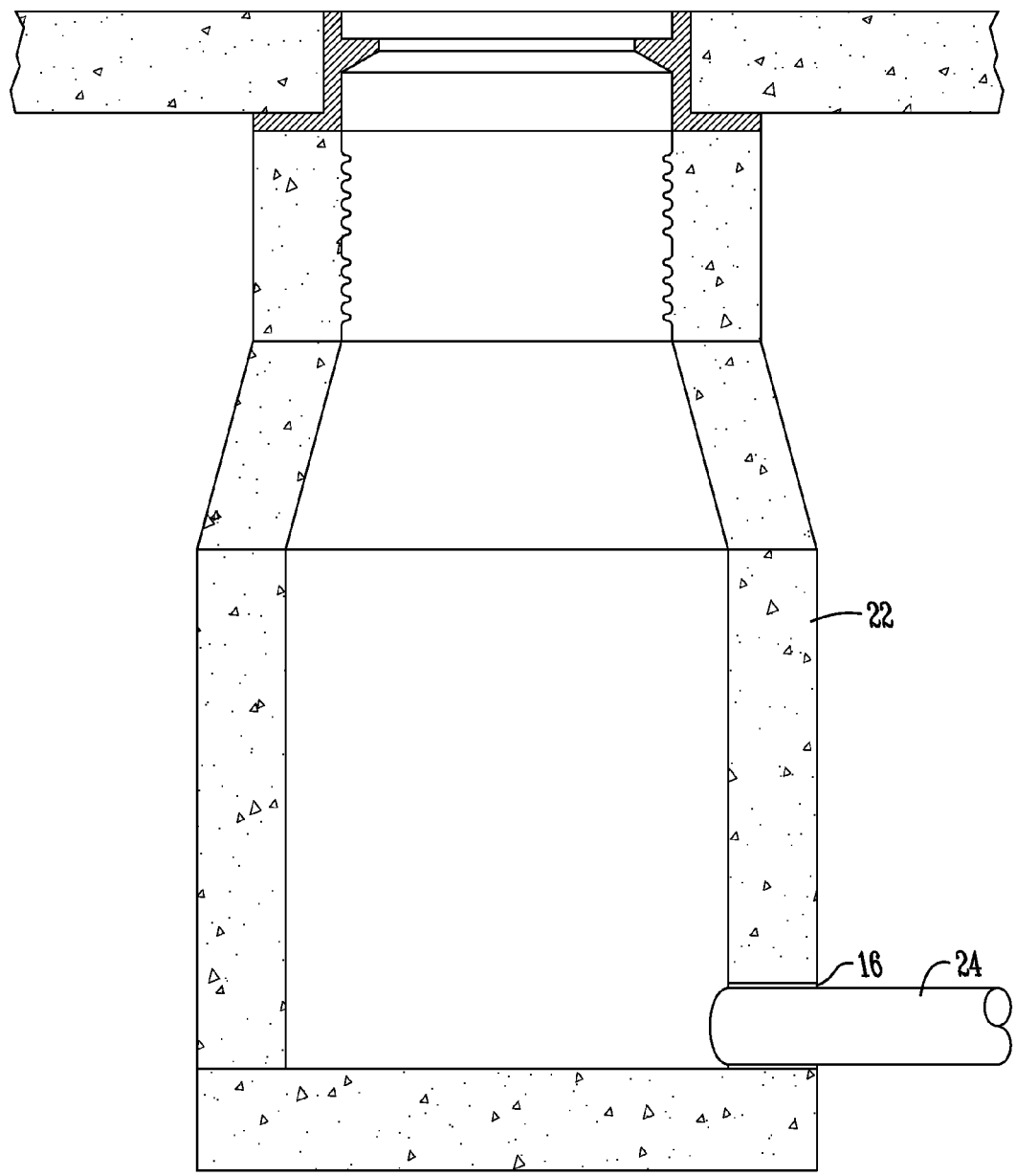
FIG. 4 is a side view of the present invention utilized for mating a PE pipeline to a concrete manhole.

Another exemplary embodiment of the present invention includes a method of restraining and sealing a PE pipe or pipe of similar material at a manhole. This is shown in FIG. 4 where the preferred epoxy adhesive 16 both restrains and seals the PE pipe 24 at the manhole 22.

Another exemplary embodiment of the present invention includes a method of repairing a junction between a main pipe 32 and a lateral pipe 34, such as is common in sewer pipelines. This embodiment of the invention makes use of the preferred two-part modified epoxy adhesive 16 and a connection assembly having a saddle 30 and a connection pipe 28 extending upwardly therefrom. The connection assembly 26 is illustrated in FIG. 3A and more fully disclosed in U.S. Pat. No. 6,705,801, the contents of which are incorporated herein by reference. The connection assembly 26 is attached to the main sewer pipe 32 with the saddle 30 surrounding a portion of the outer peripheral surface of the main sewer pipe 32 with the connection pipe 28 being aligned with a lateral opening in the main sewer pipe 32. The preferred epoxy adhesive 16 is disposed between the saddle 30 and the main sewer pipe 32. One end of the lateral sewer pipe 34 is joined with the connection pipe 28 of the connection assembly 26. The epoxy 16 is allowed to cure and bond the connection assembly 26 to the main sewer pipe 32.

The process described above and illustrated in FIG. 3A can be used in a variety of sewer main to lateral connections. For example, the original host pipe, which may be vitrified clay pipe, can be tapped and the connection assembly 26 used for connecting to a lateral pipe 34. It may also be the case that the host pipe may have a cured-in-place lining 38 that is at least partially exposed. Here, the exterior surface of the cured-in-place pipe lining 38 can be tapped using the connection assembly 26 for connecting the lateral pipe 34. It may also be the case where the main pipe 32 is broken away, revealing a lining 38 from a fold or fold/deformed and formed pipe. This is illustrated in FIG. 3C. The lining may be PE, PVC, or a modified PVC lining. In this instance, the exposed exterior surface of the lining 38 can be tapped using the connection assembly 26 for connecting to a lateral pipe 34. Such methods for tapping the main sewer for accessing the main pipe 32 or main lining 38 is achieved by either open excavation or vacuum excavation, which greatly reduces surface disruption and restoration costs.

Referring to FIG. 3B, the manner in which the saddle 30 snaps over the sewer pipe 32 can be seen. The line 48 represents the diameter of the sewer pipe 32. As can be seen the lower ends and flanges 56 of the curved plates 58 extend beyond the diameter line 48 of sewer pipe 32. When the saddle is pressed downwardly these flanges 56 spread in an outward radial direction and then snap back in place to secure the saddle 30 to the outer surface of the sewer pipe 32. This can be accomplished remotely by merely pressing downwardly on the upper end of the access pipe 34 so as to snap the saddle 30 in place.

Use of the connection assembly as described above in conjunction with the two-part modified epoxy adhesive eliminates the cost of cutting out a section of pipe and there is no need to compact gravel for bedding the pipe, as there is no cutting or removal of the pipe. Furthermore, there is no flow interruption and no fear of sewage running into the ground, which is common when cutting a section of pipe to insert a TEE or WYE fitting.

Lateral cleanouts can also be made using the connection assembly. The two-part modified epoxy adhesive bonds well to the lateral pipe on a variety of piping materials, such as PVC, vitrified clay pipe, PE, cast iron, concrete and Orangeburg (bituminous paper pipe). Here, the saddle portion of the connection assembly is fitted around the lateral pipe and a hole in the pipe is formed by coring or drilling through the connection pipe of the connection assembly.

The connection assembly with the preferred two-part modified epoxy adhesive can also be used in conjunction with pipe bursting. Pipe bursting is a widely accepted method for inserting PE pipe into an existing pipeline. The existing pipeline is burst by a bursting head with a PE pipe attached thereto. One problem with this process is that every lateral connection must be excavated to reconnect the lateral pipe. Once the excavation is performed, either a mechanical saddle or a fusable saddle is connected to the PE pipe, which is time-consuming and cumbersome. The expense of excavating each lateral connection and the restoration of pavement and other items is expensive and causes negative social impact. The laterals can be reconnected in connection with pipe bursting by using vacuum excavation to create a small bore hole and remove fragments of the old broken pipe in order to insert the connection assembly with the two-part modified epoxy adhesive as previously described. After the connection assembly has been attached to the PE pipe, a core saw is introduced through the lateral pipe of the connection assembly to tap the PE pipe.

Figure 5:
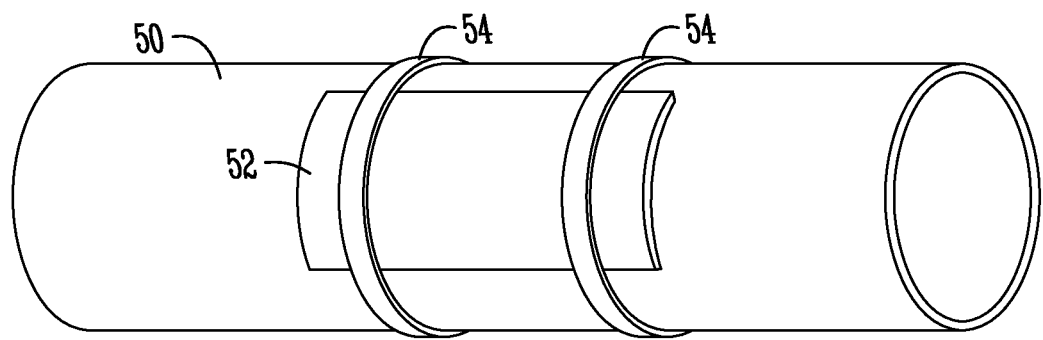
FIG. 5 is a side view of the present invention utilized to repair a cracked or leaking pipe.

The two-part modified epoxy adhesive can also be used for natural gas piping repairs and installations. Most natural gas pipelines today are constructed of PE pipe. Damaged sections of PE pipe are typically cut out and replaced by heat fusing a new section of PE pipe to the existing PE pipe. The two-part modified epoxy adhesive 16 may be used to install a patch 52 that is adhered to the existing PE pipe 50, as illustrated in FIG. 5. This patching process may be done under pressure when using an external strap 54 to hold the patch-in-place until the epoxy adhesive has cured.

Most PE pipe is butt fused together. The two-part modified epoxy adhesive may be used to connect the PE pipes by gluing pipe sections together using a coupling. Such a connection obviates the need for some fusion-type of welding. This is illustrated in FIG. 1.

Figure 6:
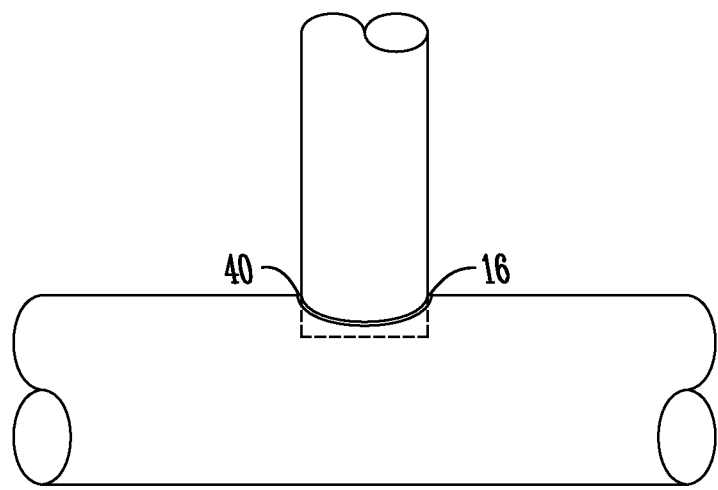
FIG. 6 is a side view of the present invention utilized to repair a leaking pipe joint.

Another embodiment of the present invention includes the use of the two-part modified epoxy adhesive 16 to seal leaking pipe joints. The epoxy adhesive can be injected into the leaking pipe joint 40 to seal the leakage, as shown in FIG. 6. This is particularly useful in sealing PE pipes.

Figure 7:
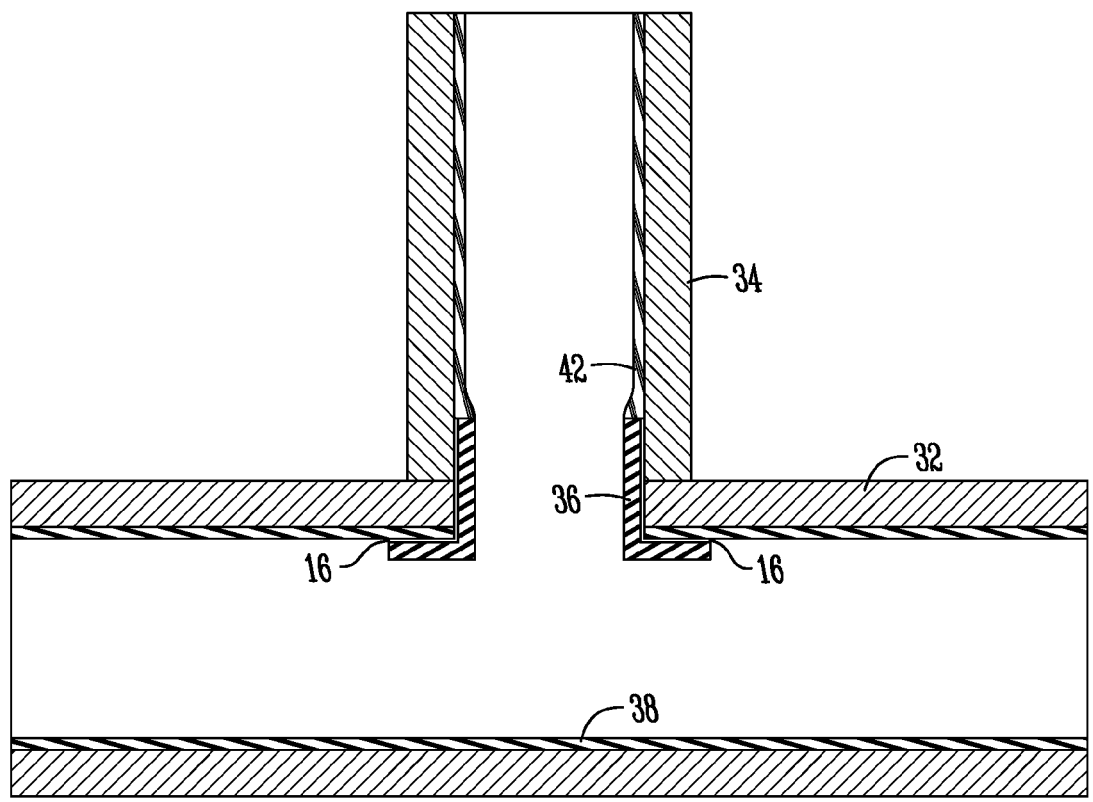
FIG. 7 is a sectional view of the present invention utilized for mating a PE pipeline or a PE film.

Another embodiment of the present invention includes the use of the preferred two-part modified epoxy adhesive 16 to install a lateral lining having a collar 36 or tube attached at its lower end for bonding to the inside of a PE pipe 34 or a cured-in-place pipe 42 having an exposed inner film of PE or other olefin material, as illustrated in FIG. 7. Lateral connection lining is common in the sewer industry; however, bonding and sealing to liners that have a PE film coating on the interior of the cured-in-place pipe has not been possible. In the past, the PE film coating must be removed by a robotic grinding machine. The epoxy adhesive 16 of the present invention will bond and seal the lateral connection liners to the PE film coating, obviating the need to remove the film coating.

Figure 8:
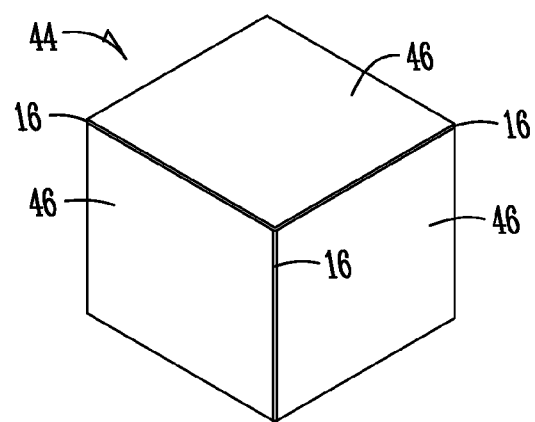
FIG. 8 is an isometric view of a container constructed from PE panels.

FIG. 8 illustrates a still further embodiment of the present invention includes the construction of a container 44 from a plurality of PE panel members 46 or like structural members 46. The durability and light weight of PE and similar plastic materials makes them desirable for use in constructing a transport container. However, connecting the various PE panel members is problematic for the reasons previously discussed. In this particular embodiment of the invention, the preferred two-part modified epoxy adhesive 16 is applied to attach the various PE panel members together and form the resulting container.

The present invention has been described with respect to exemplary embodiments. The two-part modified epoxy adhesive disclosed herein is useful in various types of construction materials, such as pipes, manholes, vaults, tunnels, conduits, bricks, tiles, and other similar materials. The epoxy adhesive, with its unusual adhesive qualities, may also be used for a variety of bonding applications in the military, automotive, and food processing fields, in addition to sewer pipeline applications.

What is claimed is:

1. A method of making or repairing a junction between a main sewer pipe and a lateral sewer pipe, the main sewer pipe having outer peripheral surface of PE, the method of making or repairing the junction comprising:
   providing a two-part modified epoxy adhesive;
   providing a connection assembly having a saddle and a connection pipe extending upwardly therefrom adapted to receive the lateral sewer pipe;

attaching the connection assembly to the main sewer pipe with the saddle surrounding a portion of the outer peripheral surface of the main sewer pipe being made of PE, the epoxy adhesive being disposed between the saddle and the main sewer pipe;

allowing the epoxy to cure and bond the connection assembly to the main sewer pipe; and wherein the modified epoxy adhesive maintains a high peel strength and flexibility when cured.

2. The method of claim 1 wherein the two-part modified epoxy adhesive is Flex-Weld brand modified epoxy adhesive from Manus Products, Inc.

3. The method of claim 1 wherein the main pipe is wet or partially submerged in water.

4. The method of claim 1 further comprising the step of accessing the main pipe through vacuum excavation.

5. The method of claim 1 wherein the saddle snaps onto the main pipe surrounding more than one half of the main pipe or extending beyond a spring line of the main pipe.

6. A method of providing access to an interior bore of a buried lateral pipe having an outer peripheral surface comprising a thermoplastic, the method comprising:

providing a two-part modified epoxy adhesive;

providing a connection assembly having a saddle and a connection pipe extending upwardly therefrom;

forming an access opening in the buried lateral pipe;

attaching the connection assembly to the thermoplastic surface of the buried lateral pipe with the saddle surrounding a portion of the outer peripheral surface of the pipe, the connection pipe being aligned with the access opening and the epoxy adhesive being disposed between the saddle and the burred pipe; and allowing the epoxy to cure and bond the buried pipe to the connection assembly;

wherein the modified epoxy adhesive maintains a high peel strength and flexibility when cured.

7. The method of claim 6 wherein the two-part modified epoxy adhesive is Flex-Weld brand modified epoxy adhesive from Manus Products, Inc.

8. The method of claim 6 further comprising:

providing an access pipe having a first end and an opposite second end; and joining and first end of the access pipe with the connection pipe of the connection assembly.

9. A method of providing access to an interior bore of a buried pipe having an outer peripheral surface and an interior lining with a thermoplastic portion of the interior lining being exposed, the method comprising:

providing a two-part modified epoxy adhesive;

providing a connection assembly having a saddle and a connection pipe extending laterally therefrom;

forming an access opening in the portion of the exposed interior lining;

attaching the connection assembly to the thermoplastic portion of the exposed interior lining with the saddle, the connection pipe being aligned with the access opening and the epoxy adhesive being disposed between the saddle and the interior lining; and allowing the epoxy to cure and bond the interior lining to the connection assembly;

wherein the modified epoxy adhesive maintains a high peel strength and flexibility when cured.

10. The method of claim 9 wherein the two-part modified epoxy adhesive is Flex-Weld brand modified epoxy adhesive from Manus Products, Inc.

11. The method of claim 9 wherein the exposed interior lining having a bonding surface comprised of PE.

12. The method of claim 11 wherein the exposed interior lining is made from PE pipe.

13. The method of claim 11 wherein the exposed interior lining is made from a cured-in-place lining.

14. The method of claim 11 further comprising:

providing an access pipe having a first end and an opposite second end; and joining and first end of the access pipe with the connection pipe of the connection assembly.

* * * * *

UNITED STATES PATENT AND TRADEMARK OFFICE
CERTIFICATE OF CORRECTION

PATENT NO. : 8,418,728 B1  
APPLICATION NO. : 12/496308  
DATED : April 16, 2013  
INVENTOR(S) : Kiest, Jr.

Page 1 of 1

It is certified that error appears in the above-identified patent and that said Letters Patent is hereby corrected as shown below:

Title Page, Line (73):
DELETE: "LMK Enterprrises, Inc."
ADD: --LMK Technologies LLC--

Signed and Sealed this
Twenty-fourth Day of September, 2013

Teresa Stanek Rea
*Deputy Director of the United States Patent and Trademark Office*